United States Patent
Singh et al.

(10) Patent No.: US 12,367,094 B2
(45) Date of Patent: Jul. 22, 2025

(54) SELF-OPTIMIZING CONTEXT-AWARE PROBLEM IDENTIFICATION FROM INFORMATION TECHNOLOGY INCIDENT REPORTS

(71) Applicant: BMC Helix, Inc., Houston, TX (US)

(72) Inventors: Mantinder Jit Singh, Vancouver (CA); Somesh Kumar Srivastava, Pune (IN); Ajoy Kumar, Santa Clara, CA (US)

(73) Assignee: BMC Helix, Inc., Houston, TX (US)

( * ) Notice: Subject to any disclaimer, the term of this patent is extended or adjusted under 35 U.S.C. 154(b) by 0 days.

(21) Appl. No.: 17/449,538

(22) Filed: Sep. 30, 2021

(65) Prior Publication Data

US 2023/0100716 A1     Mar. 30, 2023

(51) Int. Cl.
| | |
|---|---|
| *G06F 11/07* | (2006.01) |
| *G06F 18/23213* | (2023.01) |
| *G06N 20/00* | (2019.01) |

(52) U.S. Cl.
CPC ...... *G06F 11/0781* (2013.01); *G06F 11/0709* (2013.01); *G06F 11/0769* (2013.01);
(Continued)

(58) Field of Classification Search
CPC .... G06F 11/079; G06F 11/0781; G06F 18/23; G06F 18/231; G06F 18/2321; G06F 18/23211; G06F 18/23213
See application file for complete search history.

(56) References Cited

U.S. PATENT DOCUMENTS

| | | | | |
|---|---|---|---|---|
| 6,049,797 A | * | 4/2000 | Guha | G06F 18/23 |
| | | | | 707/999.005 |
| 9,009,156 B1 | * | 4/2015 | Jiang | G06N 3/0418 |
| | | | | 707/737 |

(Continued)

FOREIGN PATENT DOCUMENTS

JP     2020024645 A  *  2/2020

OTHER PUBLICATIONS

M. Botezatu et al.: "Multi-View Incident Ticket Clustering for Optimal Ticket Dispatching," KDD '15: Proceedings of the 21th ACM SIGKDD International Conference on Knowledge Discovery and Data Mining, Aug. 2015, pp. 1711-1720.

(Continued)

*Primary Examiner* — Gabriel Chu
(74) *Attorney, Agent, or Firm* — Brake Hughes Bellermann LLP (57) ABSTRACT

Information technology service management (ITSM) incident reports are converted from textual data to multiple vectors using an encoder and parameters are selected, where the parameters include a base cluster number and a threshold value. A base group of clusters is generated using an unsupervised machine learning clustering algorithm with the vectors and the parameters as input. A cluster quality score is computed for each of the base group of clusters. Each cluster from the base group of clusters with the cluster quality score above the threshold value is recursively split into new clusters until the cluster quality score for each cluster in the new clusters is below the threshold value. A final group of clusters is output, where each cluster from the final group of clusters represents ITSM incident reports related to a same problem.

12 Claims, 5 Drawing Sheets

(52) U.S. Cl.
CPC ...... *G06F 11/079* (2013.01); *G06F 18/23213* (2023.01); *G06N 20/00* (2019.01)

(56) References Cited

U.S. PATENT DOCUMENTS

| | | | |
|---|---|---|---|
| 10,346,851 | B1 | 7/2019 | Kapoor et al. |
| 10,459,951 | B2 | 10/2019 | Venkataraman et al. |
| 10,783,453 | B2 | 9/2020 | El Sayyed et al. |
| 10,977,293 | B2 | 4/2021 | Cai et al. |
| 2015/0112900 | A1* | 4/2015 | Ariyoshi ............... G06N 20/00 706/46 |
| 2015/0169732 | A1* | 6/2015 | Brown ................. G06Q 10/00 707/722 |
| 2015/0302081 | A1* | 10/2015 | Denney ................ G06F 16/444 707/737 |
| 2017/0082628 | A1* | 3/2017 | Berek .............. G01N 33/57449 |
| 2019/0087746 | A1 | 3/2019 | Jain et al. |
| 2019/0325323 | A1 | 10/2019 | Walthers et al. |
| 2020/0012728 | A1 | 1/2020 | Jan et al. |
| 2020/0226490 | A1 | 7/2020 | Abdulaal |
| 2020/0293946 | A1 | 9/2020 | Sachan et al. |
| 2020/0349199 | A1 | 11/2020 | Jayaraman |
| 2021/0157665 | A1* | 5/2021 | Rallapalli ............ G06F 11/302 |

OTHER PUBLICATIONS

P. Marcu et al.: "Towards an Optimized Model of Incident Ticket Correlation," IFIP/IEEE International Symposium on Integrated Network Management, Jul. 2009, pp. 569-576.

S. Silva et al.: "Machine Learning in Incident Categorization Automation," in 13th Iberian Conference on Information Systems and Technologies (CISTI). Caceres: IEEE, 2018, 7 pages.

W. Zhou et al.: "STAR: A System for Ticket Analysis and Resolution," KDD 2017 Applied Data Science Paper, Aug. 13-17, 2017, pp. 2181-2190.

Y. Song et al.: "Problem Classification Method to Enhance the ITIL Incident, Problem and Change Management Process," 2009 IFIP/IEEE International Symposium on Integrated Network Management, Aug. 19, 2009, 5 pages.

* cited by examiner

SELF-OPTIMIZING CONTEXT-AWARE PROBLEM IDENTIFICATION FROM INFORMATION TECHNOLOGY INCIDENT REPORTS

TECHNICAL FIELD

This description relates to self-optimizing context-aware problem identification from information technology (IT) incident reports.

BACKGROUND

Problem management in IT, and particularly IT service management (ITSM) is a cumbersome manual process, which involves manual correlation or association of multiple tickets to determine the main problem areas, reflected in multiple incidents. Every organization has different criteria, which is predominantly heuristics, rule-based, or domain-knowledge-enabled methods, to filter and analyze incidents in order to surface problems. This manual method uses spreadsheets and is therefore time consuming and results in a many problems going undetected. The issues increase further when the volume of incidents, for problem management analysis, increases.

SUMMARY

According to one general aspect, a computer-implemented method identifies problems from information technology service management (ITSM) incident reports based on textual data contained in the ITSM incident reports. A plurality of ITSM incident reports is converted from textual data to a plurality of vectors using an encoder, and parameters are selected using the plurality of ITSM incident reports by ranking and scoring fields from the plurality of ITSM incident reports. The parameters include a base cluster number and a threshold value for determining cluster quality. A base group of clusters is generated using an unsupervised machine learning clustering algorithm with the plurality of vectors and the parameters as input. A cluster quality score is computed for each of the base group of clusters, where the cluster quality score is based on a ratio of a cluster inertia value to a number of per cluster data points. Each cluster from the base group of clusters with the cluster quality score above the threshold value is recursively split into new clusters until the cluster quality score for each cluster in the new clusters is below the threshold value. A final group of clusters is output, where each cluster from the final group of clusters represents ITSM incident reports related to a same problem.

According to another general aspect, a computer program product for identifying problems from ITSM incident reports is based on textual data contained in the ITSM incident reports, is tangibly embodied on a non-transitory computer-readable medium, and includes executable code that, when executed, is configured to cause a data processing apparatus to convert a plurality of ITSM incident reports from textual data to a plurality of vectors using an encoder. The code, when executed, causes the data processing apparatus to select parameters using the plurality of ITSM incident reports by ranking and scoring fields from the plurality of ITSM incident reports. The parameters include a base cluster number and a threshold value for determining cluster quality. The code, when executed, causes the data processing apparatus to generate a base group of clusters using an unsupervised machine learning clustering algorithm with the plurality of vectors and the parameters as input and to compute a cluster quality score for each of the base group of clusters. The cluster quality score is based on a ratio of a cluster inertia value to a number of per cluster data points. When the cluster quality score is above the threshold value, the code, when executed, causes the data processing apparatus to recursively split each cluster from the base group of clusters into new clusters until the cluster quality score for each cluster in the new clusters is below the threshold value and to output a final group of clusters, where each cluster from the final group of clusters represents ITSM incident reports related to a same problem.

According to another general aspect, a system for identifying problems from ITSM incident reports based on textual data contained in the ITSM incident reports includes at least one processor and a non-transitory computer readable medium having instructions that, when executed by the at least one processor, cause the system to convert a plurality of ITSM incident reports from textual data to a plurality of vectors using an encoder, and to select parameters using the plurality of ITSM incident reports by ranking and scoring fields from the plurality of ITSM incident reports. The parameters include a base cluster number and a threshold value for determining cluster quality. The instructions, when executed by the at least one processor, cause the system to generate a base group of clusters using an unsupervised machine learning clustering algorithm with the plurality of vectors and the parameters as input and to compute a cluster quality score for each of the base group of clusters. The cluster quality score is based on a ratio of a cluster inertia value to a number of per cluster data points. The instructions, when executed by the at least one processor, cause the system to recursively split each cluster from the base group of clusters with the cluster quality score above the threshold value into new clusters until the cluster quality score for each cluster in the new clusters is below the threshold value and to output a final group of clusters, wherein each cluster from the final group of clusters represents ITSM incident reports related to a same problem.

The details of one or more implementations are set forth in the accompanying drawings and the description below. Other features will be apparent from the description and drawings, and from the claims.

DETAILED DESCRIPTION

This document describes systems and techniques for self-optimizing context-aware problem identification from ITSM incident reports (also referred to interchangeably throughout as incident reports). The systems and techniques address technical problems arising from the cumbersome manual processes to filter, sort, and group thousands and thousands of incident reports to identify problems or potential problems in an information technology (IT) system. For instance, a database of incident reports may include a large dataset of incident reports on the order of twenty thousand to millions of incident reports. A dataset of this size may represent just one month of collected data. A goal of a problem manager is to correlate and group contextually similar incident reports into identifiable problems or potential problems in the IT system. A brute force manual approach using a hyper parameter search may take dozens of hours or more on such a large dataset and still result in groupings of incident reports that include problems having low- or poor-quality metrics, meaning that the grouped incident reports may not be as contextually similar as desired.

Another technical issue encountered with a large dataset is identifying the optimum number of problems given the dataset. In a manual approach, or other approaches to identifying problems from the dataset, the number of problems is unknown, a problem manager must expend resources to determine the number of problems, and the problem manager may have to use a guessed estimate for the optimal number of problems. As mentioned above, the end result of the identified problems may be misaligned and not well correlated.

The systems and techniques described in this document solve the above-mentioned technical problems, as well as other technical problems, encountered with current approaches. The systems and techniques described in this document provide technical improvements, benefits, and advantages over current approaches. More specifically, the systems and techniques include the use of an unsupervised machine learning clustering algorithm (e.g., k-means) that can efficiently create contextual clusters of incident reports or buckets of incident reports by analyzing the textual data present in the incident reports. The unsupervised machine learning clustering algorithm groups similar incident reports automatically based on their description and/or summary and identifies potential problems and hotspots in the IT system by collective analysis of a large number of incident reports.

Prior to using the unsupervised machine learning clustering algorithm, the textual data from the incident reports are converted to vectors using an encoder. The unsupervised machine learning clustering algorithm uses numerical data, such as vectors, instead of textual data. For instance, the encoder may use a word-embedding algorithm to convert the incident reports from the textual data to vectors. Also, for example, the encoder may use textual embedding vectors from term frequency/inverse document frequency—(TF/IDF-)based transformer models or bidirectional encoder representations from transformers—(BERT-)based models. Once the encoder converts the incident reports from textual data to vectors, the vectors are input into the unsupervised machine learning clustering algorithm.

Typically, a base number or optimal number or range of clusters is also input into the unsupervised machine learning clustering algorithm that may be specified by a user, such as the problem manager. For example, if a k-means unsupervised machine learning clustering algorithm is used, the problem manager inputs a k-value, which represents the optimal number of problems expected to be output from the clustering algorithm based on the incident reports being input into the clustering algorithm. The systems and techniques described here eliminate the need for the user to input such a value. For example, the user does not need to input a pre-defined number of optimal clusters or a pre-defined range for the number of optimal clusters into the unsupervised machine learning clustering algorithm.

Instead, the systems and techniques described here automatically estimate and determine a base-k or base-k range to input into the unsupervised machine learning clustering algorithm using both current incident report data and historic incident report data. The systems and techniques also may use additional parameters determined automatically from the incident report data as additional inputs to the unsupervised machine learning clustering algorithm to further optimize the algorithm. In addition, a silhouette value (or coefficient) may be applied to the automatically estimated base-k or base-k range to further improve the output of the unsupervised machine learning clustering algorithm.

The systems and techniques described here output a base group of clusters from the unsupervised machine learning clustering algorithm. A cluster quality score is computed for each cluster in the base group of clusters. The cluster quality score is a metric that represents the cohesiveness and the quality of the cluster. In some implementations, the cluster quality score varies between 0 and 1, where clusters with values close to 0 signifies a more cohesive cluster than clusters with values close to 1. For a cluster with a cluster quality score above a threshold value, the cluster is split into a smaller cluster to increase the cohesiveness and the cluster quality score for the newly formed clusters from the split cluster. This is an automatic and recursive process that is repeated for each cluster having a cluster quality score above the threshold value until each cluster has a cluster quality score below the threshold value and a final group of clusters remains.

Furthermore, the systems and techniques described here identify each cluster with a tag or label that includes a few words to describe the cluster. Cluster tags or cluster labels may be automatically generated for each cluster by analyzing the token closest to the cluster centroid in every cluster. The top terms from the closest token are used for the cluster labels. The closer a token is to the cluster centroid, then the higher the probability of these tokens being present in multiple incident reports that are similar, and hence better chances of them conveying the context of the cluster in a few words (e.g., 3 or 4 words).

In this manner, the combination of the automatically estimated base-k or base-k range and the recursive splitting of clusters using a cluster quality score results in a self-optimizing technical solution that forms cohesive clusters of incident reports, where each cluster represents a problem or potential problem or issue in the IT system. Optionally, each cluster is identified by multiple cluster labels or cluster tags that identify and convey the context of the cluster. The result is that the time-consuming and error-prone manual efforts or other efforts to define clusters of incident reports is eliminated.

Figure 1:
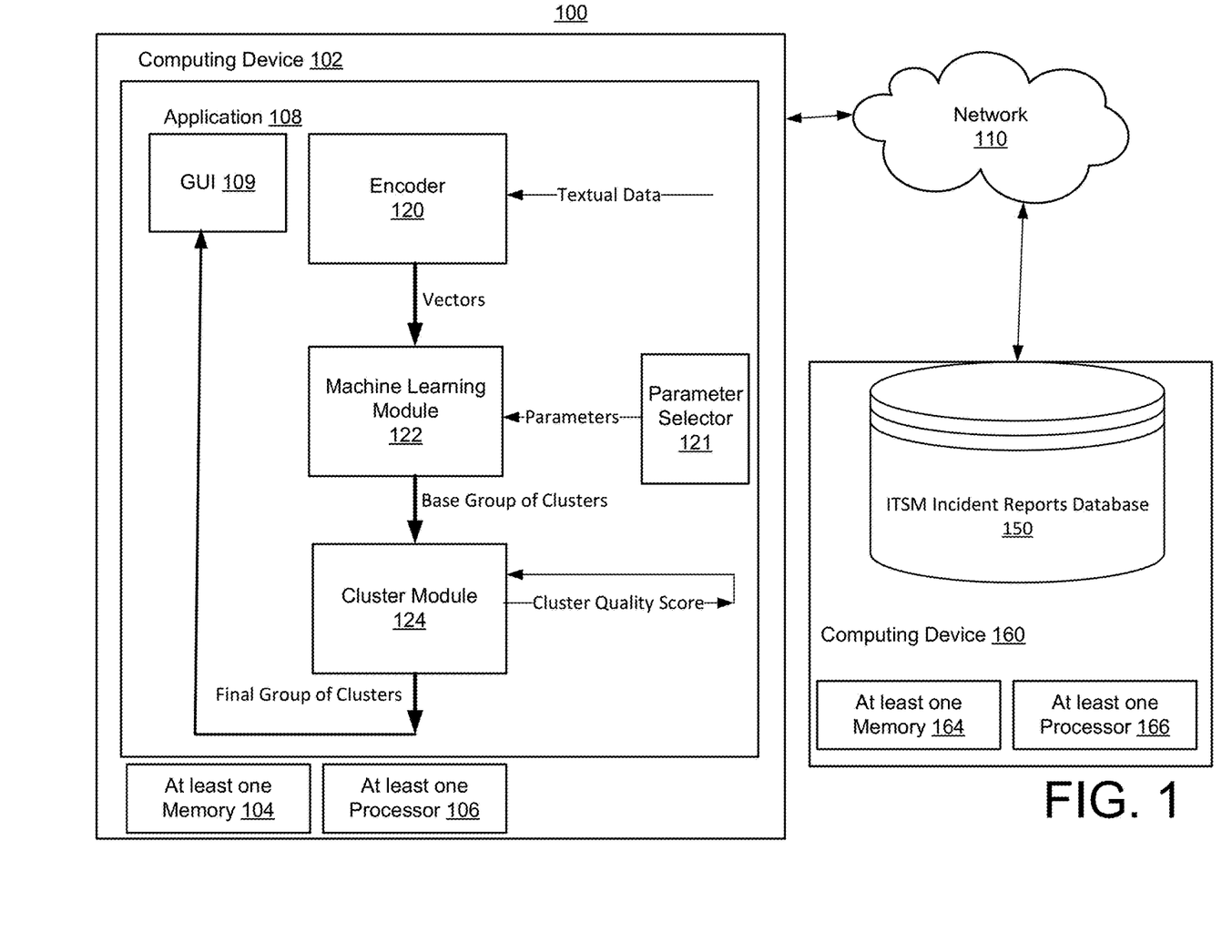
FIG. 1 is an example block diagram of a system for identifying problems from ITSM incident reports based on textual data contained in the incident reports.

FIG. 1 is an example block diagram of a system 100 for identifying problems from ITSM incident reports based on textual data contained in the incident reports. The system 100 correlates incident reports into multiple clusters of incident reports, where each cluster represents a same or similar problem based on the commonality of the correlated incident reports. As noted above, the system 100 is self-optimizing because the system 100 estimates a number of optimal final clusters or a range of optimal final clusters without the user having to estimate the number of the range of an optimal number of final clusters. As the system 100 generates a base group of clusters using the estimate as one of the inputs, the system 100 uses a cluster quality score to recursively refine the base group of clusters into a final group of clusters.

The system 100 includes a computing device 102, a network 110, and an ITSM incident reports database 150 (hereinafter, database 150). The computing device 102 includes at least one memory 104, at least one processor 106, and at least one application 108. The computing device 102 may communicate with one or more other computing devices over the network 110. For instance, the computing device 102 may communicate with the database 150 over the network 110. The computing device 102 may be implemented as a server (e.g., an application server), a desktop computer, a laptop computer, a mobile device such as a tablet device or mobile phone device, a mainframe, as well as other types of computing devices. Although a single computing device 102 is illustrated, the computing device 102 may be representative of multiple computing devices in communication with one another, such as multiple servers in communication with one another being utilized to perform various functions over a network. In some implementations, the computing device 102 may be representative of multiple virtual machines in communication with one another in a virtual server environment. In some implementations, the computing device 102 may be representative of one or more mainframe computing devices.

The at least one processor 106 may represent two or more processors on the computing device 102 executing in parallel and utilizing corresponding instructions stored using the at least one memory 104. The at least one processor 106 may include at least one graphics processing unit (GPU) and/or central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as clusters of incident reports and corresponding cluster quality scores, cluster inertia values, cluster data points, and other data and information used by and/or generated by the application 108 and the components used by application 108.

The network 110 may be implemented as the Internet but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network, where a user accesses the application 108 from another computing device over a network, such as the network 110.

The database 150 includes ITSM incident reports. An ITSM incident report (or simply incident report) includes documentation of an event that has disrupted the normal operation of some information technology (IT) system or that had the potential to do so. The database 150 collects and stores incident reports from devices and applications (i.e., both hardware devices and software) in an IT system. For example, the database 150 collects and stores incident reports from devices and applications connected to the network 110. The incident reports may be continuously collected, organized, and stored in the database 150. The incident reports include one or more fields of textual data. For example, the reports may include fields for description, detailed description, notes, resolution, date, time, and location. The incident reports also may include one or more categories containing textual data such as, for example, severity, status, priority, service, company name, as well as some metric fields including total resolution time, and total efforts. One or more of these fields and/or categories may be used for parameter selection, as discussed in more detail below.

In some implementations, the database 150 is implemented on a computing device 160. The computing device 160 includes at least one memory 164 and at least one processor 166. The computing device 160 may communicate with one or more other computing devices over the network 110. For instance, the computing device 160 may communicate with the computing device 102 over the network 110. The computing device 160 may be implemented as a server (e.g., an application server), a desktop computer, a laptop computer, a mobile device such as a tablet device or mobile phone device, a mainframe, as well as other types of computing devices. Although a single computing device 160 is illustrated, the computing device 160 may be representative of multiple computing devices in communication with one another, such as multiple servers in communication with one another being utilized to perform its various functions over a network. In some implementations, the computing device 160 may be representative of multiple virtual machines in communication with one another in a virtual server environment. In some implementations, the computing device 160 may be representative of one or more mainframe computing devices. The at least one memory 164 and the at least one processor 166 include the same or similar functions as the at least one memory 104 and the at least one processor 106, respectively, as described above.

In some implementations, the database 150 may be implemented on the computing device 102, instead of on a separate computing device such as the computing device 160.

The application 108 includes multiple components to enable the clustering of incident reports into one or more groups. The application 108 includes a graphical user interface (GUI) 109, an encoder 120, a parameter selector 121, a machine learning module 122, and a cluster module 124. In general operation, a user may interface with the application 108 through the GUI 109. The GUI 109 provides an interface for the user to make selections and otherwise interact with the application 108. For instance, the user may set up the application 108 to group or cluster incident reports into identifiable problems or potential problems on a periodic frequency (e.g., hourly, daily, weekly, bi-weekly, etc.). In this manner, the application 108 may group incident reports on a particular periodic frequency in an automated manner without further user intervention. Incident reports falling within the designated frequency would be pulled from the database 150 and input into the encoder 120.

In some implementations, the application 108 may enable the user to select a time range or a date range through the GUI 109, where incident reports falling within the selected range would be processed by the application 108 and grouped into clusters. For instance, the user may select a submit date or last resolved date as part of selections for a date range for incident reports within a selected time period.

The application 108 also may enable the user to set other settings and configurations through the GUI 109. For example, the GUI 109 may include a job configuration page that enables one or more of the following inputs or selections by the user. In some implementations, the job configuration page may include one or more filters to select incident reports based on any field values such as, for example, Severity=High, Priority=Critical, Status=Closed or any other selectable field values or any other incident report field or category. In some implementations, the selections of fields by the user may be separate and apart from any default system fields, which may be pre-selected for any job execution. In some implementations, the default system fields may be configurable by the user. In some implementations, the GUI 109 may enable the user to select a "group-by" option in case the user wants to create clusters for every group based on a selected field such as, for example, service, company, status, etc. In some implementations, the GUI 109 may enable the user to select one or more options to provide a number of desired clusters as selected by the user or to let the application 108 determine the optimal number of clusters.

In general operation, the encoder 120 is configured to convert an ITSM incident report from textual data to a vector so that the incident report is in a proper format for further processing by the machine learning module 122. The text-based fields from the incident report are converted to a vector using an algorithm configured to perform a conversion from text-based data to vector-based data. The encoder 120 receives multiple incident reports from the database 150 based on either default application 108 criteria and/or criteria selected by a user interacting with the application 108 using the GUI 109, as described above.

In some implementations, the encoder 120 receives incident reports having textual data from one or more fields of the incident reports. The incident reports also may include textual data in the form of category information in addition to the textual data from one or more fields. The encoder 120 uses an encoder architecture of transformer algorithms to convert the textual data from the fields and/or categories into numerical data in the form of one or more vectors. In some implementations, one example of an encoder architecture of transformer algorithms is a word-embedding algorithm to convert the textual data from the incident reports into numerical data in the form of vectors, which are output from the encoder 120 and input into the machine learning module 122. In some implementations, the word-embedding algorithm may use textual embedding vectors from TF/IDF-based transformer models or BERT-based models to encode and transform the textual data from the incident reports to numerical data in the form of vectors. The TD/IDF-based transformer models or BERT-based models take the textual data from the incident reports as input and transform or convert the textual data into one or more vectors as output. The vectors that are output from the encoder 120 are input into the machine learning module 122.

In addition to the vectors that are input into the machine learning module 122, one or more parameters from the parameter selector 121 are input into the machine learning module 122. The parameter selector 121 uses information from the incident reports in the database 150 to generate one or more parameters for input into the machine learning module 122. The parameter selector 121 may generate parameters from previous incident reports that have previously been run through the application 108 and grouped into clusters. The parameter selector 121 also may generate parameters from the current incident reports currently being run through the application 108 for grouping into clusters.

In some implementations, the parameters include a base cluster number and a threshold value for determining cluster quality. In some implementations, the parameter selector 121 generates an estimate for a base number of clusters or a range of clusters, which represent an estimated optimal number of a base group of clusters expected to be output by the machine learning module 122. For example, the parameter selector 121 may use historic run data of on previous incident reports to determine the base cluster number. The parameter selector 121 may use pre-existing categorical features present in the underlying data set like "Operational Categorization" or "Support Group" and a set of derived metrics, which reflects the number of unique records as per the textual feature of the incident reports to come to a range for a base cluster number. Once a range is established, a silhouette coefficient may be calculated for all the possible k values within the range, and the one that is closest to 1 is selected as the value for the base number of clusters. The silhouette coefficient provides an indication of how far away the datapoints in the cluster are, from the datapoints in another cluster. The range of the silhouette coefficient is between −1 and 1. In this manner, an initial base range is determined using the categorical features and set of derived metrics, and the silhouette coefficient is applied to the base range to arrive at a base number of clusters.

In some implementations, the parameter selector 121 uses current incident reports to rank and score the fields from the current incident reports to determine one or more of the parameters. For instance, the parameters may include a number of subclusters, the threshold value, a maximum number of recursive iterations, and a minimum cluster size. In some implementations, one or more fields of the incident reports are identified as important and input into the parameter selector 121. This optional list of fields that are identified as important is input into the parameter selector 121 along with a default field list. In some implementations, the default field list and/or the fields identified as important may include a service field, a product name field, and a category field. The parameter selector 121 performs data analysis on the field list and the values of the fields from the selected group of incident reports. Based on the data analysis, the parameter selector 121 selects the highest-ranked "group-by" categorical field and the highest-ranked text field and combines these into a field score. Field scoring may be performed on the basis of the current data, which includes checking the cardinality and variability of categorical fields and the uniqueness of records and length of text in textual fields. In some implementations, the field scoring may be obtained from historical runs as well. Additional details with respect to the parameter selection are provided below in reference to FIG. 3.

Once the parameter selector 121 determines the parameters from the current incident reports and the historic run data, including a base cluster number and a threshold value for determining cluster quality, the parameters are input into the machine learning module 122 along with the vectors that were output from the encoder 120. The machine learning module 122 is configured to generate a base group of clusters using the vectors from the encoder 120 as input along with one or more parameters generated by the parameter selector 121 from the incident reports. In some implementations, the machine learning module 122 uses a k-means unsupervised machine learning algorithm to generate the base group of clusters. In these implementations, the user does not need to provide the machine learning module 122 with a base k value because the parameter selector 121 automatically generates the base number of clusters as one of the parameters input into the machine learning module 122. To form the base clusters, the machine learning module 122 aligns the vectors into n-dimensional space and then calculates the Euclidean distances and optimizes the clusters by shifting the centroids.

In some implementations, the machine learning module 122 may use other type of unsupervised machine learning algorithms to generate and output a base group of clusters. For example, the machine learning module 122 may use DBSCAN, hierarchal clustering, Expectation-Maximization (EM) clustering using Gaussian Mixture Models (GMM), or a Mean-Shift Clustering algorithm.

The machine learning module 122 outputs a base group of clusters, which is input into the cluster module 124. The cluster module 124 is configured to compute a cluster quality score for each of the base group of clusters and then recursively split from the base group of clusters, clusters having a cluster quality score above the threshold value and place them into new clusters. First, the cluster module 124 computes a cluster quality score for each group of the base group of clusters. As described above, the cluster quality score is a metric that represents the cohesiveness and the quality of the cluster. Each cluster has a centroid or center of the cluster. A higher quality or good cluster is one that has all of the incident reports closer to the centroid. A lower quality or poor cluster is one that does not have all of the incident reports closer to the centroid. The cluster quality score provides a metric to evaluate whether or not a cluster is a good cluster or a poor cluster.

The cluster quality score for each cluster is obtained by determining the inertia value for each cluster. Then, the inertia value is divided by the number of data points in the cluster to obtain the cluster quality score. The cluster quality score ranges between 0 and 1, where values close to 0 signify more cohesive clusters. This metric provides an accurate measurement of cluster quality. Inertia is a measure of the cohesiveness of each cluster that is measured by taking the within-cluster-sum-of-squared distances between each data point and the cluster centroid. The inertia is calculated by the following formula:

$$\text{Within Cluster Sum of Squares, WCSS} = \Sigma(X-Y!)"$$
$$!\in \$$$

Where, X are centroid of each cluster
Y! are points in each cluster

The inertia value indicates how far away the points within a cluster are; therefore, a small value for inertia is desirable. The range of inertia's value starts from zero and goes higher. Once the inertia is calculated for each cluster, the cluster quality score for each cluster is determined by dividing the inertia value by number of data points in the cluster. For each of the base group of clusters, the cluster module 124 then compares the cluster quality score against the threshold value. If the cluster quality score is below the threshold value, then the cluster is determined to be a good cluster and is set aside for inclusion as part of the final group of clusters. If the cluster quality score is above the threshold value, then the cluster is determined to be a poor cluster and is split by the cluster module 124 into two smaller clusters, which are re-evaluated based on calculating a new cluster quality score for the two smaller clusters.

The cluster module 124 continuously performs this recursive split for each of the clusters having a cluster quality score above the threshold value until the cluster quality score for each cluster in the new clusters is below the threshold value. The cluster module 124 then outputs a final group of clusters, where each cluster from the final group of clusters represents ITSM incident reports related to a same or similar problem.

In this manner, application 108 is self-optimizing because the parameter selector 121 automatically determines a base number of clusters to input into the machine learning module 122 and then the resulting base group of clusters output from the machine learning module 122 is further refined in an automated manner by the cluster module 124 calculating a cluster quality score for each cluster and recursively splitting clusters until all the clusters in the final group of clusters have a cluster quality score below the threshold value.

Additionally, the cluster module 124 generates a multiple word tag (or token or label) for every cluster in the final group of clusters. In some implementations, the multiple word tag may be a 3-word tag (or 3-word token). The cluster module 124 analyzes the incident report closest to the cluster centroid and uses the three most dominant terms from that report as the 3-word tag. An incident report is broken into tokens (words) that form the n-dimensional vector space around the centroid of every cluster, where post convergency of k-means (or any clustering) algorithm has the most similar vectors closest to the centroid. The 3-word tag is generated by fetching the top three distinct tokens closest to the cluster centroid that are the most relevant for providing labels or identifiers, which describe the cluster.

Figure 2:
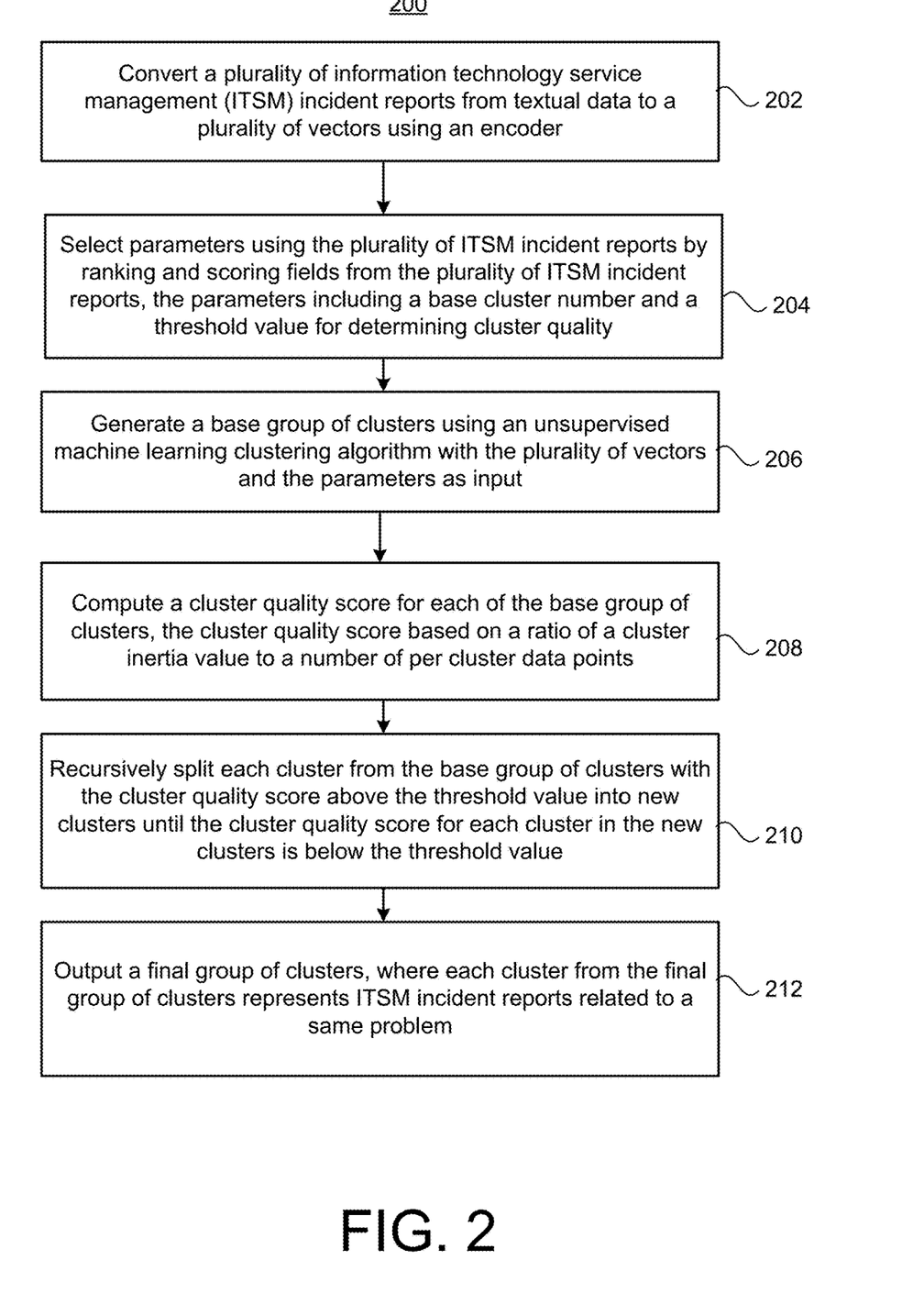
FIG. 2 is an example flowchart illustrating example operations of the system of FIG. 1.

FIG. 2 is an example flowchart for a process 200 illustrating example operations of the system 100 of FIG. 1. More specifically, process 200 illustrates an example of a computer-implemented method to identify problems from ITSM incident reports based on textual data contained in the incident reports. The result of the process 200 is a final group of clusters of ITSM incident reports, where each cluster represents ITSM incident reports related to a same (or similar) problem. Process 200 provides an automated solution to grouping multiple (e.g., thousands, tens of thousands, millions, etc.) incident reports into meaningful clusters of identifiable problems based on their contextual similarity present in the textual data of the report's description. Process 200 eliminates a brute force, manual approach to correlating ITSM incident reports into clusters of identifiable problems. Process 200 eliminates users from having to manually obtain the data and manually manipulate spreadsheets to filter and sort the data to correlate multiple, similar-looking incident reports into clusters. The manual effort is time-consuming, error-prone and does not guarantee detection of all potential problems. Process 200 provides a technical solution that solves these technical problems.

Instructions for the performance of process 200 may be stored in the at least one memory 104 of FIG. 1 and the stored instructions may be executed by the at least one processor 106 of FIG. 1 on the computing device 102. Additionally, the execution of the stored instructions may cause the at least one processor 106 to implement the application 108 and its components.

Process 200 includes converting a plurality of ITSM incident reports from textual data to a plurality of vectors using an encoder (202). As described above, the encoder 120 is configured to convert the incident reports from textual data to numerical data in the form of vectors. The encoder 120 uses an encoder architecture of transformer algorithms to convert the textual data from the fields and/or categories into numerical data in the form of one or more vectors.

In some implementations, one example of an encoder architecture of transformer algorithms is a word-embedding algorithm to convert the textual data from the incident reports into numerical data in the form of vectors that are output from the encoder 120 and input into the machine learning module 122. In some implementations, the word-embedding algorithm may use textual embedding vectors from TF/IDF-based transformer models or BERT-based models to encode and transform the textual data from the incident reports to numerical data in the form of vectors. The TD/IDF-based transformer models or BERT-based models take the textual data from the incident reports as input and transform or convert the textual data into one or more vectors as output.

Process 200 includes selecting parameters using the plurality of ITSM incident reports by ranking and scoring fields from the plurality of ITSM incident reports, where the parameters include a base cluster number and a threshold value for determining cluster quality (204). For example, the parameter selector 121 is configured to select parameters using the incident reports by ranking and scoring fields from the incident reports. In some implementations, the parameters include a base cluster number and a threshold value for determining cluster quality. In some implementations, the parameter selector 121 generates an estimate for a base number of clusters or a range of clusters that represent an estimated optimal number of a base group of clusters expected to be output by the machine learning module 122. For example, the parameter selector 121 may use historic run data of on previous incident reports to determine the base cluster number.

Figure 3:
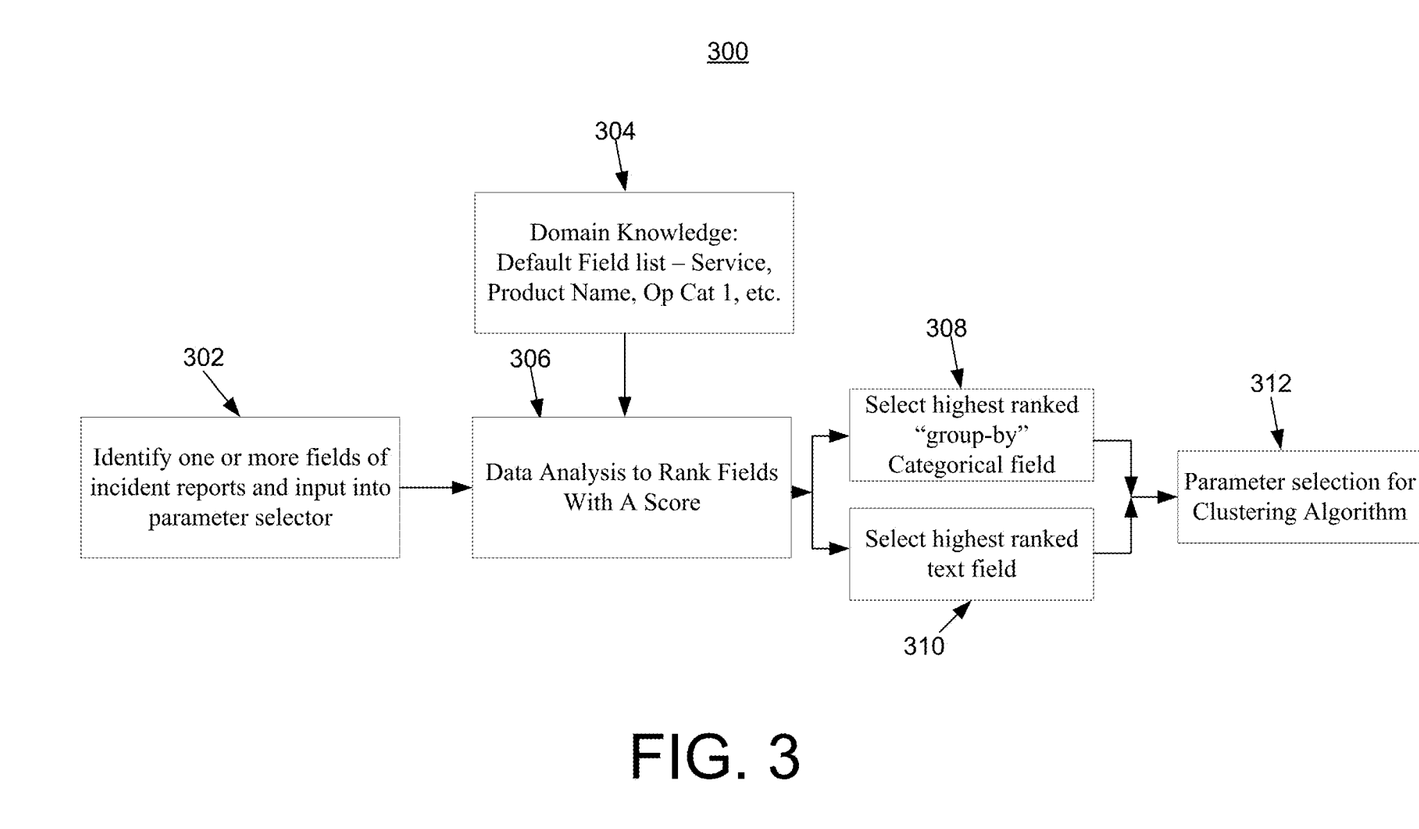
FIG. 3 is an example flowchart illustrating example operations of the parameter selector of FIG. 1.

Referring to FIG. 3, an example process 300 illustrates the operations of the parameter selector 121 to select one or more parameters as input to the machine learning module 122. In some implementations, one or more fields of the incident reports are identified as important and input into the parameter selector 121 (302). This optional list of fields identified as important is input into the parameter selector 121 along with a default field list (304). In some implementations, the default field list 304 and/or the fields identified as important may include a service field, a product name field, and a category field. The parameter selector 121 performs data analysis on the field list and the values of the fields from the selected group of incident reports to rank the fields with a score (306). Based on the data analysis, the parameter selector 121 selects the highest-ranked "group-by" categorical field (308) and the highest-ranked text field (310) and combines these into a field score and a determination of the parameters to input into the machine learning module 122 (312).

Referring back to FIG. 2, process 200 includes generating a base group of clusters using an unsupervised machine learning clustering algorithm with the plurality of vectors and the parameters as input (206). For example, the machine learning module 122 is configured to generate a base group of clusters using an unsupervised machine learning clustering algorithm with the vectors that represent the incident reports and the parameters as input. The unsupervised machine learning clustering algorithm groups the incident reports into clusters based on the similarity of the incident reports and outputs a base group of clusters.

Process 200 includes computing a cluster quality score for each of the base group of clusters, where the cluster quality score is based on a ratio of a cluster inertia value to a number of per cluster data points (208). For example, the cluster module 124 is configured to compute a cluster quality score for each of the base group of clusters, where the cluster quality score is based on a ratio of a cluster inertia value to a number of per cluster data points (208).

First, the cluster module 124 computes a cluster quality score for each group of the base group of clusters. As described above, the cluster quality score is a metric that represents the cohesiveness and the quality of the cluster. Each cluster has a centroid or center of the cluster. A higher-quality or good cluster is one that has all of the incident reports closer to the centroid. A lower-quality or poor cluster is one that does not have all of the incident reports closer to the centroid. The cluster quality score provides a metric to evaluate whether or not a cluster is a good cluster or a poor cluster.

Figure 4:
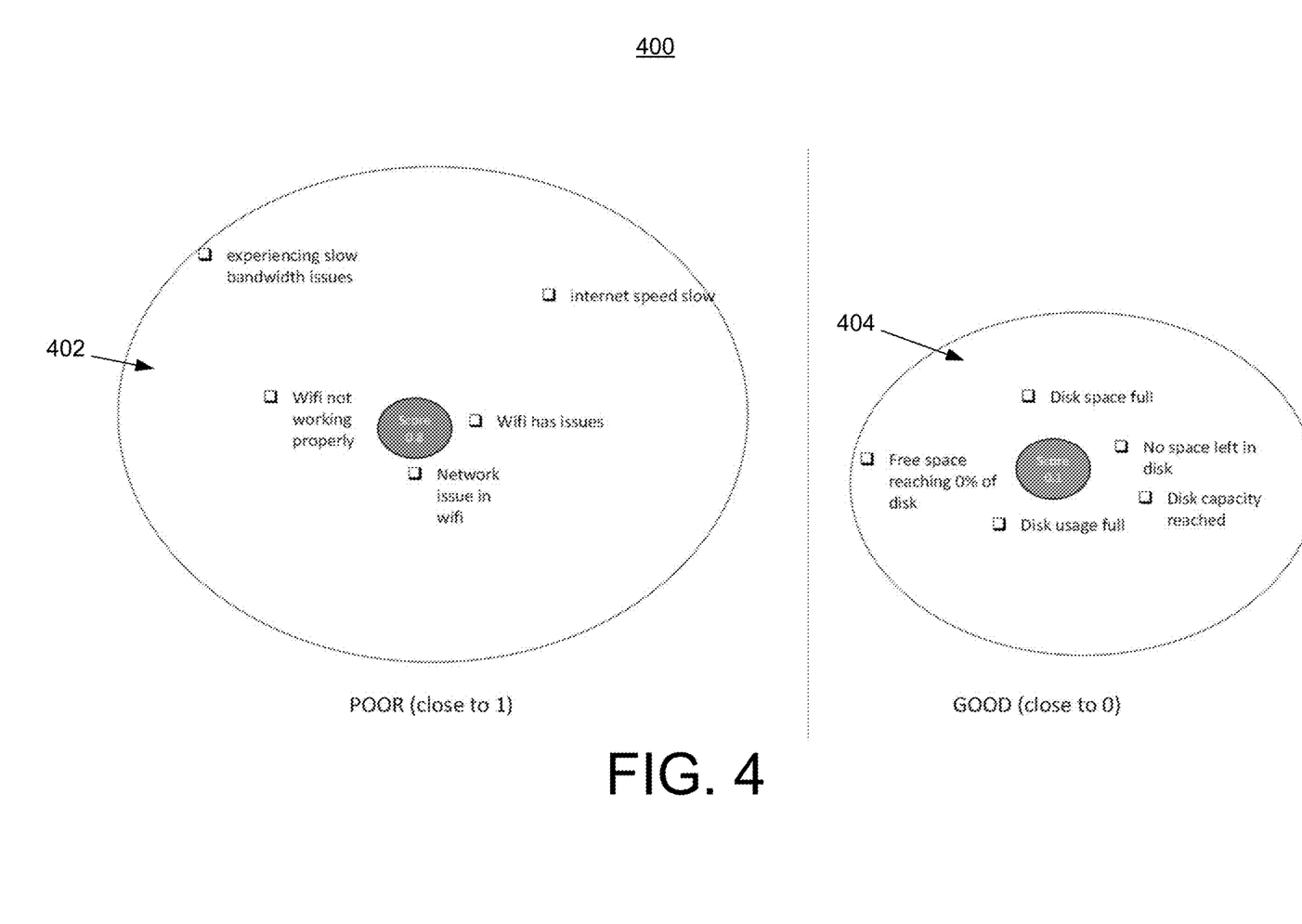
FIG. 4 is an example schematic of a base group of clusters.

Referring to FIG. 4, an example schematic illustrates a base group of clusters 400 output from the machine learning module 122, which includes two clusters 402 and 404. The cluster module 124 calculates a cluster quality score for each of the two clusters 402 and 404. Cluster 402 has a cluster quality score of 0.8, which indicates that the cluster is "Poor" meaning that the incident reports grouped in the cluster are not cohesive. As seen in the schematic, three of the incident reports are close to the centroid of the cluster, while two of the incident reports are farther away from the centroid. Cluster 404 has a cluster quality score of 0.1, which indicates that the cluster is "Good" meaning that the incident reports grouped in the cluster are cohesive. As seen in the schematic, all of the incident reports are close to the centroid of the cluster. In this example, cluster 402 will undergo further processing by the cluster module 124 and cluster 404 will be set aside and included in the final group of clusters.

Referring back to FIG. 2, process 200 includes recursively splitting each cluster from the base group of clusters with the cluster quality score above the threshold value into new clusters until the cluster quality score for each cluster in the new clusters is below the threshold value (210). For example, the cluster module 124 is configured to recursively split from the base group of clusters, clusters that have the cluster quality score above the threshold value into new clusters until the cluster quality score for each cluster in the new clusters is below the threshold value (210).

Figure 5:
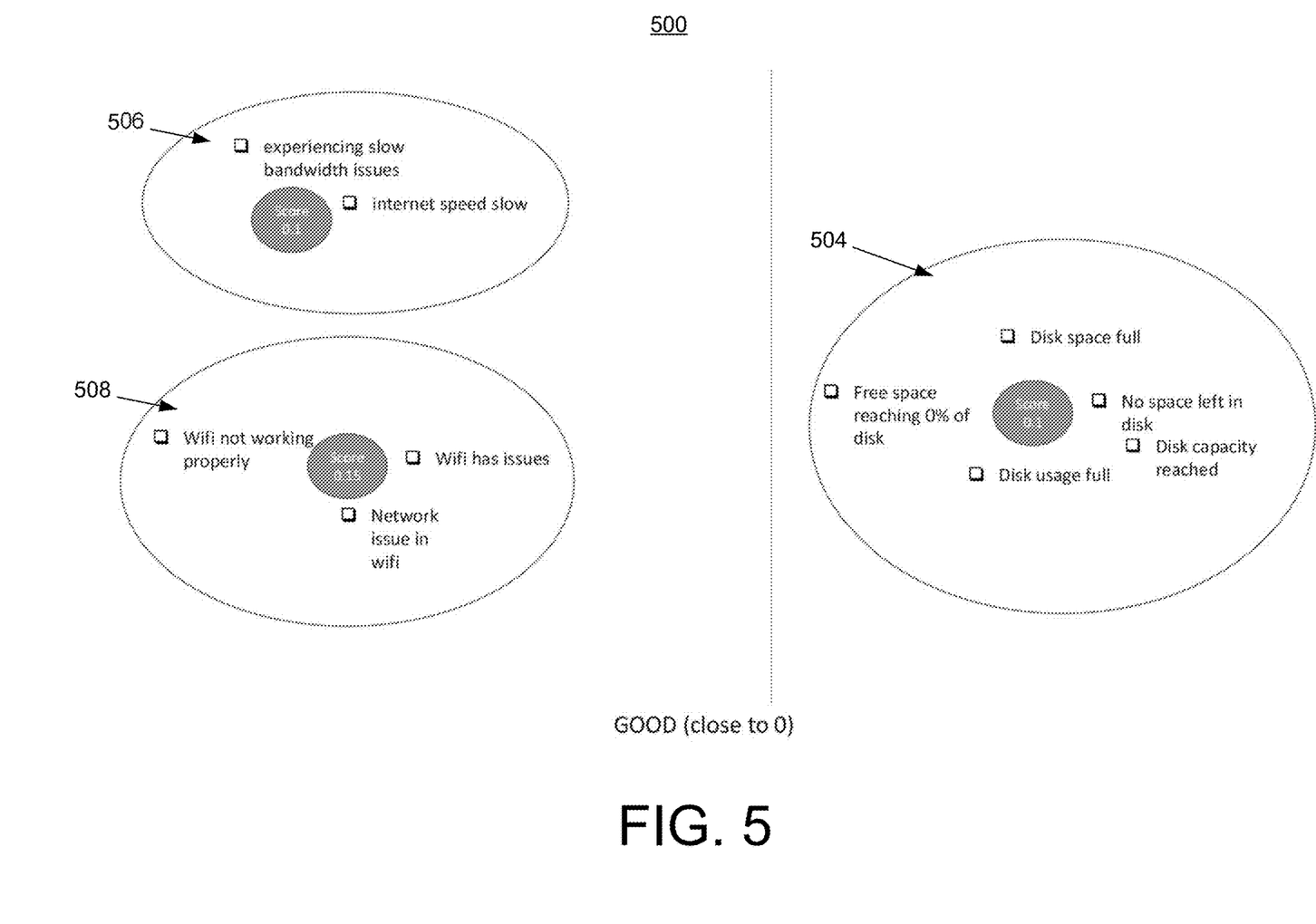
FIG. 5 is an example schematic of a final group of clusters.

Referring to FIG. 5, an example schematic illustrates a final group of clusters 500. From FIG. 4, the cluster module 124 determined that cluster 404 (shown as 504 on FIG. 5) had a cluster quality score below the threshold value, which resulted in a "good" cluster. The cluster module 124 split the poor cluster 402 into two smaller clusters 506 and 508 and calculated the cluster quality scores for the new clusters 506 and 508. The cluster 506 has a cluster quality score of 0.1, which is close to zero and below the threshold value. As seen in the schematic, the incident reports are grouped closer together to the centroid of the cluster 506. The cluster 508 has a cluster quality score of 0.15, which is close to zero and below the threshold value. As seen in the schematic, the incident reports are grouped closer together to the centroid of the cluster 508.

Referring back to FIG. 2, process 200 includes outputting a final group of clusters, where each cluster from the final group of clusters represents ITSM incident reports related to a same problem (212). For example, the cluster module 124 outputs a final group of clusters, where each cluster from the final group of clusters represents incident reports related to a same problem.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identifying problems from information technology service management (ITSM) incident reports based on textual data contained in the ITSM incident reports, the method comprising:
converting a plurality of ITSM incident reports from textual data to a plurality of vectors using an encoder, the encoder using a word embedding algorithm, wherein the plurality of ITSM incident reports includes at least thousands of ITSM incident reports;
automatically determining, without user input, a base cluster number using both current incident report data and historic incident report data;
selecting parameters using the plurality of ITSM incident reports by ranking and scoring fields from the plurality of ITSM incident reports by performing data analysis using a cardinality and variability of categorical fields and a uniqueness of records and length of text in textual fields, the parameters including the automatically determined base cluster number, a threshold value for determining cluster quality, a number of subclusters, a maximum number of recursive iterations, and a minimum cluster size obtained from the data analysis;
inputting the plurality of vectors and the parameters, including the automatically determined base cluster number, to a machine learning module using an unsupervised machine learning clustering algorithm, the unsupervised machine learning clustering algorithm including a k-means unsupervised machine learning algorithm;
generating and outputting a base group of clusters using the unsupervised machine learning clustering algorithm by aligning the plurality of vectors into n-dimensional space, determining Euclidean distances, and shifting centroids to form the base group of clusters;
computing a cluster quality score for each of the base group of clusters, the cluster quality score based on a ratio of a cluster inertia value to a number of per cluster data points;
recursively splitting each cluster from the base group of clusters with the cluster quality score above the threshold value into new clusters until the cluster quality score for each cluster in the new clusters is below the threshold value;
outputting a final group of clusters based on the number of subclusters, the maximum number of recursive iterations, and the minimum cluster size obtained from the data analysis, wherein each cluster from the final group of clusters represents ITSM incident reports related to a same problem; and
automatically generating a multi-word label for each cluster from the final group of clusters using terms from an incident report closest to a centroid of the cluster for the multi-word label.

2. The computer-implemented method as in claim 1, wherein the encoder includes a term frequency/inverse document frequency (TF/IDF) model to convert the plurality of ITSM incident reports from the textual data to the plurality of vectors.

3. The computer-implemented method as in claim 1, wherein the encoder includes a bidirectional encoder representations (BERT) model to convert the plurality of ITSM incident reports from the textual data to the plurality of vectors.

4. The computer-implemented method as in claim 1, wherein selecting the parameters comprises generating a range for the base cluster number using one or more categorical features and a derived set of metrics reflecting a number of unique records per categorical feature and applying a silhouette coefficient to the range to generate the base cluster number.

5. A computer program product for identifying problems from information technology service management (ITSM) incident reports based on textual data contained in the ITSM incident reports, the computer program product being tangibly embodied on a non-transitory computer-readable medium and including executable code that, when executed, is configured to cause a data processing apparatus to:
   convert a plurality of ITSM incident reports from textual data to a plurality of vectors using an encoder, the encoder using a word embedding algorithm, wherein the plurality of ITSM incident reports includes at least thousands of ITSM incident reports;
   automatically determine, without user input, a base cluster number using both current incident report data and historic incident report data;
   select parameters using the plurality of ITSM incident reports by ranking and scoring fields from the plurality of ITSM incident reports by performing data analysis using a cardinality and variability of categorical fields and a uniqueness of records and length of text in textual fields, the parameters including a base cluster number, a threshold value for determining cluster quality, a number of subclusters, a maximum number of recursive iterations, and a minimum cluster size obtained from the data analysis;
   input the plurality of vectors and the parameters to a machine learning module using an unsupervised machine learning clustering algorithm, the unsupervised machine learning clustering algorithm including a k-means unsupervised machine learning algorithm;
   generate and output a base group of clusters using an the unsupervised machine learning clustering algorithm by aligning the plurality of vectors into n-dimensional space, determining Euclidean distances, and shifting centroids to form the base group of clusters;
   compute a cluster quality score for each of the base group of clusters, the cluster quality score based on a ratio of a cluster inertia value to a number of per cluster data points;
   recursively split each cluster from the base group of clusters with the cluster quality score above the threshold value into new clusters until the cluster quality score for each cluster in the new clusters is below the threshold value;
   output a final group of clusters based on the number of subclusters, the maximum number of recursive iterations, and the minimum cluster size obtained from the data analysis, wherein each cluster from the final group of clusters represents ITSM incident reports related to a same problem;
   automatically generate a multi-word label for each cluster from the final group of clusters using terms from an incident report closest to a centroid of the cluster for the multi-word label.

6. The computer program product of claim 5, wherein the encoder includes a term frequency/inverse document frequency (TF/IDF) model to convert the plurality of ITSM incident reports from the textual data to the plurality of vectors.

7. The computer program product of claim 5, wherein the encoder includes a bidirectional encoder representations (BERT) model to convert the plurality of ITSM incident reports from the textual data to the plurality of vectors.

8. The computer program product of claim 5, wherein selecting the parameters comprises generating a range for the base cluster number using one or more categorical features and a derived set of metrics reflecting a number of unique records per categorical feature and applying a silhouette coefficient to the range to generate the base cluster number.

9. A system for identifying problems from information technology service management (ITSM) incident reports based on textual data contained in the ITSM incident reports, the system comprising:
   at least one processor; and
   a non-transitory computer readable medium comprising instructions that, when executed by the at least one processor, cause the system to:
      convert a plurality of ITSM incident reports from textual data to a plurality of vectors using an encoder, the encoder using a word embedding algorithm, wherein the plurality of ITSM incident reports includes at least thousands of ITSM incident reports;
      automatically determine, without user input, a base cluster number using both current incident report data and historic incident report data;
      select parameters using the plurality of ITSM incident reports by ranking and scoring fields from the plurality of ITSM incident reports by performing data analysis using a cardinality and variability of categorical fields and a uniqueness of records and length of text in textual fields, the parameters including the automatically determined base cluster number, a threshold value for determining cluster quality, a number of subclusters, a maximum number of recursive iterations, and a minimum cluster size obtained from the data analysis;
      input the plurality of vectors and the parameters, including the automatically determined base cluster number, to a machine learning module using an unsupervised machine learning clustering algorithm, the unsupervised machine learning clustering algorithm including a k-means unsupervised machine learning algorithm;
      generate and output a base group of clusters using the unsupervised machine learning clustering algorithm by aligning the plurality of vectors into n-dimensional space, determining Euclidean distances, and shifting centroids to form the base group of clusters;
      compute a cluster quality score for each of the base group of clusters, the cluster quality score based on a ratio of a cluster inertia value to a number of per cluster data points;
      recursively split each cluster from the base group of clusters with the cluster quality score above the threshold value into new clusters until the cluster quality score for each cluster in the new clusters is below the threshold value;
      output a final group of clusters based on the number of subclusters, the maximum number of recursive iterations, and the minimum cluster size obtained from the data analysis, wherein each cluster from the final group of clusters represents ITSM incident reports related to a same problem;

automatically generate a multi-word label for each cluster from the final group of clusters using terms from an incident report closest to a centroid of the cluster for the multi-word label.

10. The system of claim 9, wherein the encoder includes a term frequency/inverse document frequency (TF/IDF) model to convert the plurality of ITSM incident reports from the textual data to the plurality of vectors.

11. The system of claim 9, wherein the encoder includes a bidirectional encoder representations (BERT) model to convert the plurality of ITSM incident reports from the textual data to the plurality of vectors.

12. The system of claim 9, wherein selecting the parameters comprises generating a range for the base cluster number using one or more categorical features and a derived set of metrics reflecting a number of unique records per categorical feature and applying a silhouette coefficient to the range to generate the base cluster number.

* * * * *